(12) United States Patent
Hattori et al.

(10) Patent No.: US 7,337,679 B2
(45) Date of Patent: Mar. 4, 2008

(54) ROTATION SENSOR

(75) Inventors: Tadashi Hattori, Hisai (JP); Masashi Sugimoto, Hisai (JP)

(73) Assignee: Sumiden Electronics, Ltd., Mie (JP)

( * ) Notice: Subject to any disclaimer, the term of this patent is extended or adjusted under 35 U.S.C. 154(b) by 0 days.

(21) Appl. No.: 11/137,500

(22) Filed: May 26, 2005

(65) Prior Publication Data

US 2006/0016274 A1    Jan. 26, 2006

(30) Foreign Application Priority Data

Jul. 20, 2004    (JP) ............................ 2004-211831

(51) Int. Cl.
*G01B 7/30* (2006.01)
(52) U.S. Cl. .............................. 73/862.08; 324/207.25
(58) Field of Classification Search ............. 73/862.08; 324/207.25
See application file for complete search history.

(56) References Cited

U.S. PATENT DOCUMENTS

| | | | | |
|---|---|---|---|---|
| 4,847,557 A | * | 7/1989 | Saito et al. ............ | 324/207.13 |
| 5,138,258 A | * | 8/1992 | Murata .................... | 324/207.2 |
| 5,426,844 A | * | 6/1995 | Suda et al. ................... | 29/606 |
| 6,025,710 A | * | 2/2000 | Schneider et al. .......... | 324/173 |
| 6,157,186 A | * | 12/2000 | Aoki et al. ................. | 324/174 |
| 6,291,990 B1 | | 9/2001 | Nakane et al. | |
| 6,427,316 B1 | * | 8/2002 | Shinjo et al. ............... | 29/602.1 |
| 6,497,035 B1 | * | 12/2002 | Ratliff ......................... | 29/596 |
| 6,693,418 B2 | * | 2/2004 | Kubik ........................ | 324/174 |
| 6,932,382 B2 | * | 8/2005 | Hayes et al. ................ | 280/735 |

(Continued)

FOREIGN PATENT DOCUMENTS

JP    02-276970    11/1990

(Continued)

OTHER PUBLICATIONS

Japanese Office Action, with English translation, issued in Japanese Patent Application No. JP 2004-211831, mailed Jul. 10, 2007.

(Continued)

*Primary Examiner*—Edward Lefkowitz
*Assistant Examiner*—Punam Patel
(74) *Attorney, Agent, or Firm*—McDermott Will & Emery LLP (57) ABSTRACT

A rotation sensor includes a rotation detector mounted on a holder which is in turn inserted in a casing through its opening. A cover is formed by molding a resin so as to cover the opening of the casing and the portion of the holder protruding from the opening of the casing. A pair of relay terminals extend through a base portion of the holder and a gap defined in the holder, are fixed to a support wall, and connected to respective lead pieces of the detector. A resin cover is formed by molding a resin. When forming the cover, pressure is applied to the holder, thereby causing the holder to bulge axially in the holder. This in turn pushes the relay terminals in the axial direction. But since the relay terminals are fixed to the support wall, the support wall will absorb such pushing force, thereby preventing such pushing from being transmitted to the detector. In order to more effectively absorb such pushing force, the relay terminals may be provided with bent portions in the gap.

5 Claims, 5 Drawing Sheets

U.S. PATENT DOCUMENTS

| | | | |
|---|---|---|---|
| 7,098,651 B2 * | 8/2006 | Matsumoto et al. | 324/173 |
| 2003/0193328 A1 * | 10/2003 | Iwashita | 324/207.2 |
| 2004/0080314 A1 * | 4/2004 | Tsujii et al. | 324/207.21 |
| 2005/0016297 A1 * | 1/2005 | Aoki et al. | 73/862.635 |
| 2005/0127904 A1 * | 6/2005 | Tawara | 324/207.13 |
| 2006/0017433 A1 * | 1/2006 | Hattori | 324/207.25 |

FOREIGN PATENT DOCUMENTS

| | | |
|---|---|---|
| JP | 6-82477 | 3/1994 |
| JP | 11-153452 | 6/1999 |
| JP | 200-171475 | 6/2000 |
| JP | 2002-257840 A | 9/2002 |
| JP | 2003-66059 | 3/2003 |
| JP | 2003-307523 A | 10/2003 |

OTHER PUBLICATIONS

Japanese Office Action with English Translation issued in corresponding Japanese Patent Application No. 2004-211831, dated on Sep. 27, 2007.

* cited by examiner

Prior Art

ROTATION SENSOR

BACKGROUND OF THE INVENTION

The present invention relates to a rotation sensor such as a vehicle wheel speed sensor or an engine revolution sensor.

Figure 9:
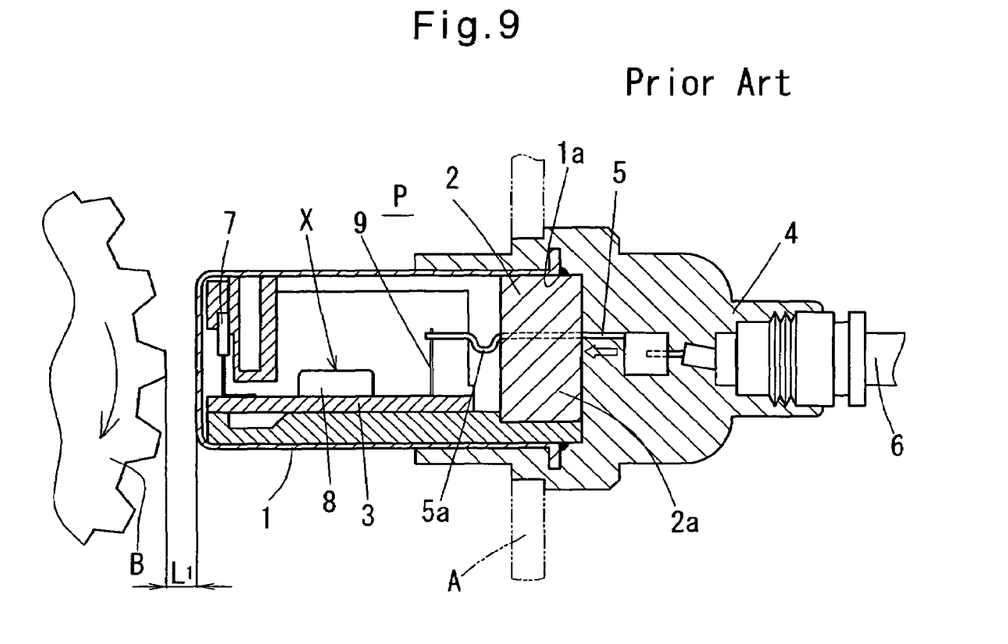
FIG. 9 is a sectional front view of a conventional rotation sensor.

FIG. 9 shows a conventional wheel speed sensor P. It includes a detector X mounted on a circuit board 3 which is in turn carried on a resin holder 2. With the detector X mounted on the holder 2, the holder 2 is inserted into a cylindrical casing 1 having open and closed ends from its open end 1a until a base portion 2a of the holder 2 closes the open end of the casing 1. A pair of lead wires 9 extending from the detector X are each connected to one of a pair of relay terminals 5 which extend through the base portion 2a of the holder 2 and protrudes from its outer end face. The relay terminals 5 have their protruding ends connected to an output cable 6. A cover 4 is formed by molding a resin to completely conceal the portion of the holder 2 protruding from the open end 1a of the casing 1 and to embed therein the protruding ends of the relay terminals 5 and the portion of the cable 6 connected to the terminals 5.

The detector X typically comprises an IC chip for detecting magnetic fields and electronic parts (circuit) for controlling (as disclosed in JP Patent publication 2002-257840, FIG. 4) or comprises an electromagnetic pickup including a pole piece provided inside of a bobbin on which a coil is wound, and a magnet provided rearwardly of the pole piece (as disclosed in the above publication, FIG. 1).

As shown in FIG. 9, the wheel speed sensor P is mounted on a mounting member A with its detector X opposing a rotary member B to be detected. The detector X picks up any change in the magnetic field produced from the rotary member B when the rotary member B rotates, and converts the change in the magnetic field to electrical signals which are transferred to a control device through the relay terminals 5 and the output cable 6. The rotary member B is a ferromagnetic pulse ring having teeth similar to gear teeth on the radially outer periphery thereof, or a magnet pulse ring having its radially outer periphery magnetized such that North poles and South poles circumferentially alternate with each other.

As today's motor vehicles are increasingly sophisticated, it is necessary to densely pack various devices and components, besides wheel speed sensors, in a limited space. Thus, smaller wheel speed sensors are required. To reduce the size of a wheel speed sensor, its components have to be arranged closer to one another. This increases the possibility of interference of each component with other components and poses other problems.

For example, pressure produced when forming the resin cover 4 tends to have a detrimental influence on the detector X. Specifically, when forming the cover 4 by molding a resin, pressure is applied through a flange 1b of the casing 1 to the holder 2 as shown by the arrow in FIG. 9. This tends to cause the base portion 2a of the holder 2 to bulge in the axial direction in the casing 1. The relay terminals 5 are thus pushed in the axial direction too, thus detrimentally influencing an electronic part 8 and a rotation sensor element 7, namely, lowering the detection accuracy.

One possible way to protect the electronic part 8 and the sensor element 7 would be to provide each relay terminal 5 with a bent portion 5a as shown in FIG. 9 so that the bent portions 5a can absorb any axial pushing force applied to the relay terminals 5.

But in order for the bent portions 5a to sufficiently absorb such axial pushing force, they have to have their both ends fixedly supported by stationary, fixed members or portions.

In this regard, in the arrangement of FIG. 9, each bent portion 5a is connected to one of a pair of flexible, insulated or bare lead wires 9. That is, each bent portion 5a is not fixedly supported by a stationary, fixed member or portion at least at one end thereof. Thus, the bent portions 5a cannot sufficiently absorb any axial pushing force applied to the relay terminals 5. Such axial force is mostly absorbed by the flexible lead wires 9 instead. However, in the arrangement of FIG. 9, since the lead wires 9 are not directly connected to the sensor element 7 or the electronic part 8, any axial pushing force applied to the relay terminals 5 will not be transmitted to the sensor element 7 or the electronic part 8 even without the bent portions 5a. Thus, the bent portions 5a do not serve to protect the sensor element 7 or the electronic part 8 from axial pushing force applied to the relay terminals 5.

In order to answer the requirements for compactness, many of today's rotation sensors X do not include the circuit board 3 shown in FIG. 9 In this arrangement, a pair of lead pieces, which carry an electronic part, extend directly from the sensor element 7 in parallel to each other, and the relay terminals 5 are directly connected to the respective lead pieces.

In this arrangement, since the lead pieces are directly connected to the sensor element 7, any axial pushing force applied to the relay terminals 5 tends to be transmitted to the sensor element 7, thus detrimentally influencing the sensor element 7.

An object of the invention is to minimize transmission of any axial pushing force applied to the relay terminals when the cover 4 is formed to the detector X.

SUMMARY OF THE INVENTION

According to the present invention, there is provided a rotation sensor comprising a casing having an opening at one end thereof, a holder having a base portion and inserted in the casing with the base portion fitted in the opening of the casing, a detector mounted on the housing and received in the housing for sensing any change in a magnetic field produced when a rotary member rotates and converting such change in the magnetic field to electrical signals, a pair of relay terminals having protruding ends protruding from an outer end face of the base portion of the holder, an output line connected to the protruding ends of the relay terminals, a cover formed of a resin and covering the opening of the casing, a portion of the holder protruding outwardly from the opening of the casing, the protruding ends of the relay terminals, and a portion of the output line connected to the protruding ends of the relay terminals, the holder being formed of a resin and defining a gap, and a support wall fixed to the holder, the relay terminals extending through the base portion of the holder and the gap, being fixed to the support wall and connected to the detector.

With this arrangement, even when the axial pushing force is applied to the relay terminals when the cover is formed by molding a resin, since the relay terminals are fixed to the support wall, such axial pushing force will be scarcely transmitted to the detector. Such axial pushing force will also be absorbed due to bending or deflection of the relay terminals.

Figure 1:
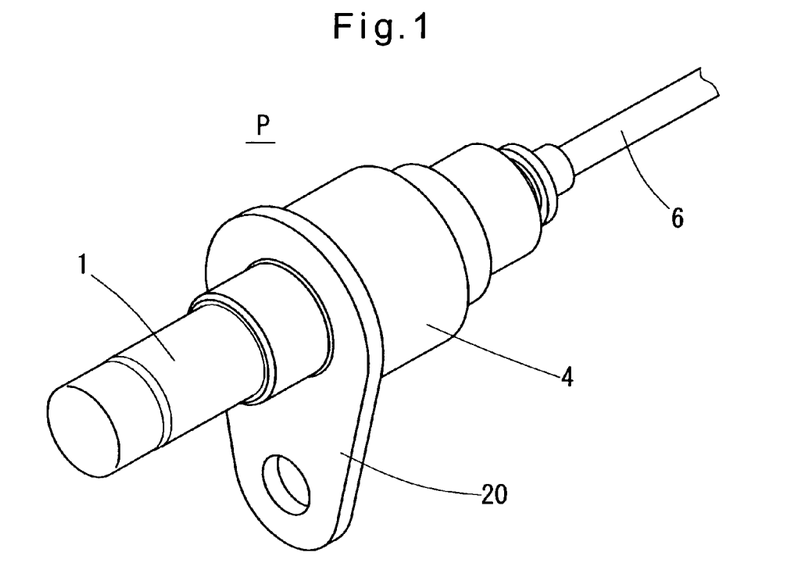
FIG. 1 is a perspective view of a rotation sensor embodying the present invention.
Figure 2:
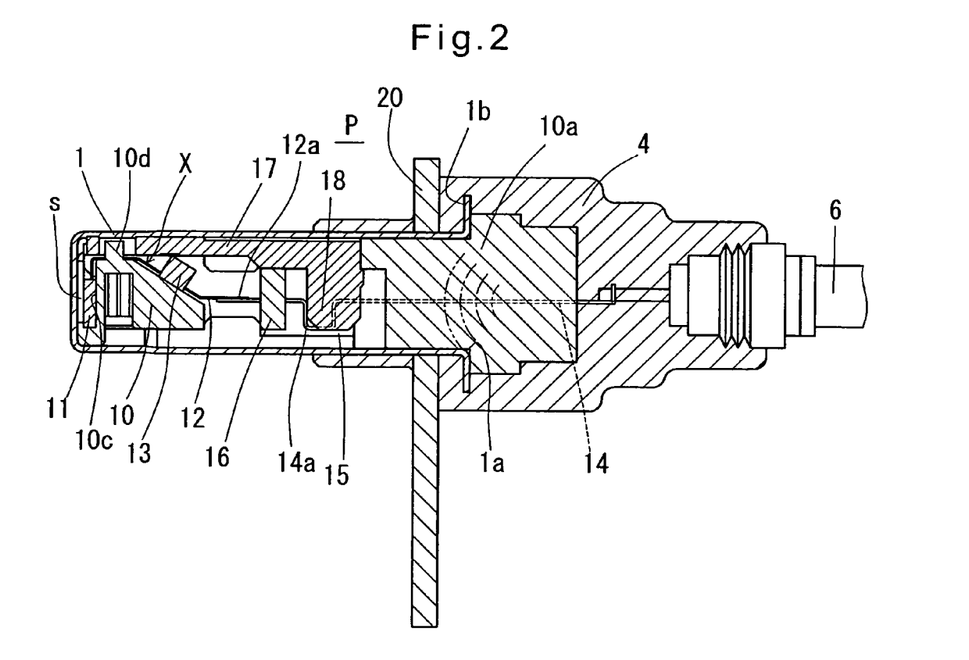
FIG. 2 is a front view in vertical section of the rotation sensor of FIG. 1.
Figure 3:
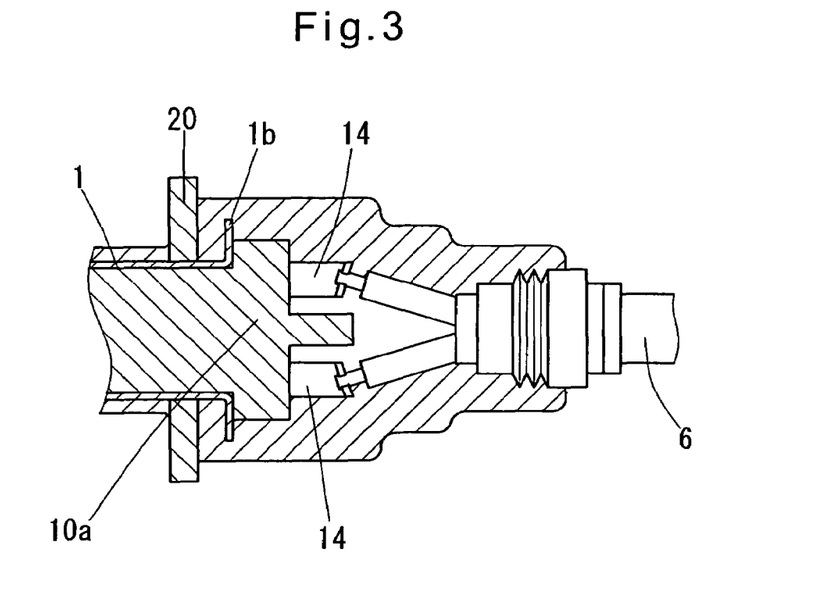
FIG. 3 is a partial sectional plan view of the rotation sensor of FIG. 1.
Figure 4:
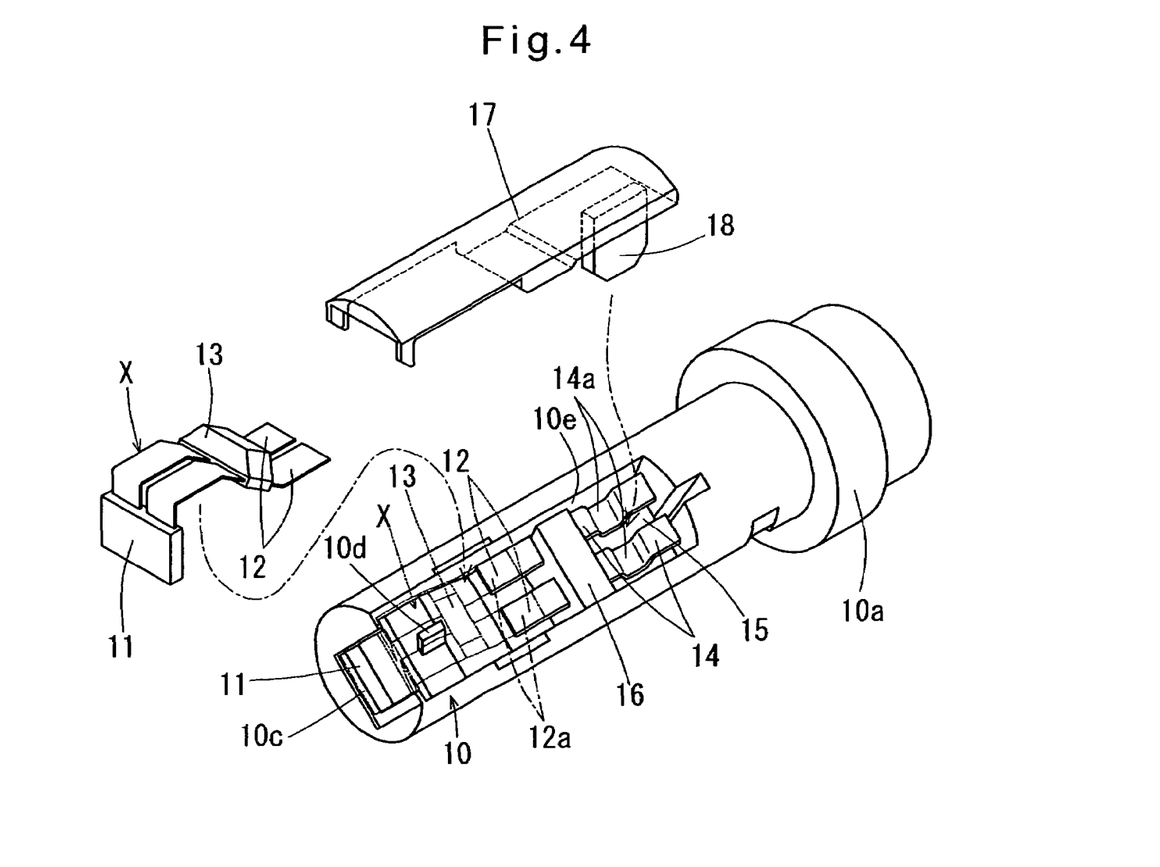
FIG. 4 is a partial exploded perspective view of the rotation sensor of FIG. 1.

As shown in FIG. 2, pressure produced when forming the resin cover 4 propagates forwardly (leftwardly in the figure) through the base portion of the holder while gradually weakening, and disappears eventually. The support wall is therefore preferably provided sufficiently forwardly of the base portion of the holder so that pressure produced when forming the resin cover will not propagate to the support wall. But as long as the support wall can sufficiently keep the pushing force applied to the relay terminals from being transmitted to the detector, its position is not particularly limited.

From another aspect of the invention, there is provided a rotation sensor comprising a casing having an opening at one end thereof, a holder having a base portion and inserted in the casing with the base portion fitted in the opening of the casing, a detector mounted on the housing and received in the housing for sensing any change in a magnetic field produced when a rotary member rotates and converting such change in the magnetic field to electrical signals, a pair of relay terminals having protruding ends protruding from an outer end face of the base portion of the holder, an output line connected to the protruding ends of the relay terminals, and a cover formed of a resin and covering the opening of the casing, a portion of the holder protruding outwardly from the opening of the casing, the protruding ends of the relay terminals, and a portion of the output line connected to the protruding ends of the relay terminals, the holder being formed of a resin and defining a gap, the detector comprising a sensor element for sensing any change in the magnetic field produced from the rotary member, and a pair of lead pieces extending from the sensor element in parallel to each other, the relay terminals extending through the base portion of the holder and the gap, and each being connected to one of the pair of lead pieces, each of the relay terminals having a bent portion for absorbing any pushing force applied through the base portion of the holder.

In this arrangement, since the relay pieces are fixed, unlike the bent portions shown in FIG. 9, the bent portions of the present invention can sufficiently absorb any axial pushing force, thus preventing such force from being transmitted to the sensor element. But the shape and material of the bent portions should be determined so that axial pushing force can be more effectively absorbed by the bent portions. Also, in order to more stably fix the lead pieces to the holder, protrusions formed on the holder may be engaged in cutouts or holes formed in the lead pieces.

The rotation sensor in the latter arrangement may further comprise a support wall connected to the holder, the relay terminals extending through the base portion of the holder, the gap and the support wall and each being connected to one of the pair of lead pieces. With this arrangement, the support wall serves to further reduce the influence of pressure produced when forming the resin cover on the detector.

The rotation sensor may further comprise a lid having a projection and inserted in an opening formed in the holder with the projection inserted between the pair of relay terminals, between the pair of terminals, or between connecting portions of the relay terminals connected to the detector such as to the lead pieces. With this arrangement, the projection formed on the lid separates and insulates the pair of relay terminals as well as the pair of lead pieces, thereby preventing short-circuiting. If the lid cannot be snugly fit in the opening of the holder, this means that its projection cannot be inserted between the relay terminals or between the lead pieces because at least one of the relay terminals is not properly set in position. Thus, defects of the rotary sensor can be found quickly.

Preferably, a gap is defined between the inner surface of an end wall of the casing and the end face of the holder opposing the inner surface of the end wall. Such a gap prevents the detector from colliding against the end wall of the casing even if the holder moves axially toward the end wall of the casing under the pressure produced when the resin case of formed.

BRIEF DESCRIPTION OF THE DRAWINGS

Other features and objects of the present invention will become apparent from the following description made with reference to the accompanying drawings.

DETAILED DESCRIPTION OF THE PREFERRED EMBODIMENTS

The rotation sensor shown in FIGS. 1-6 is a wheel speed sensor P. Elements identical to those shown in FIG. 9 are denoted by identical numerals. The sensor P includes a rotation detector X comprising a sensor element 11 such as a Hall IC for detecting any change in the magnetic field produced from the rotary member B to be detected (see FIG. 9), lead pieces 12 extending from the sensor element 11 parallel to each other, and a resin-coated electronic part 13 such as a capacitor extending between the lead pieces 12. The sensor P of the embodiment has no circuit board 3 as shown in FIG. 9. Thus, electronic parts other than the electronic part 3 are provided outside of a casing 1. If the electronic part 3 is a capacitor, it prevents electrostatic discharge.

Figure 8:
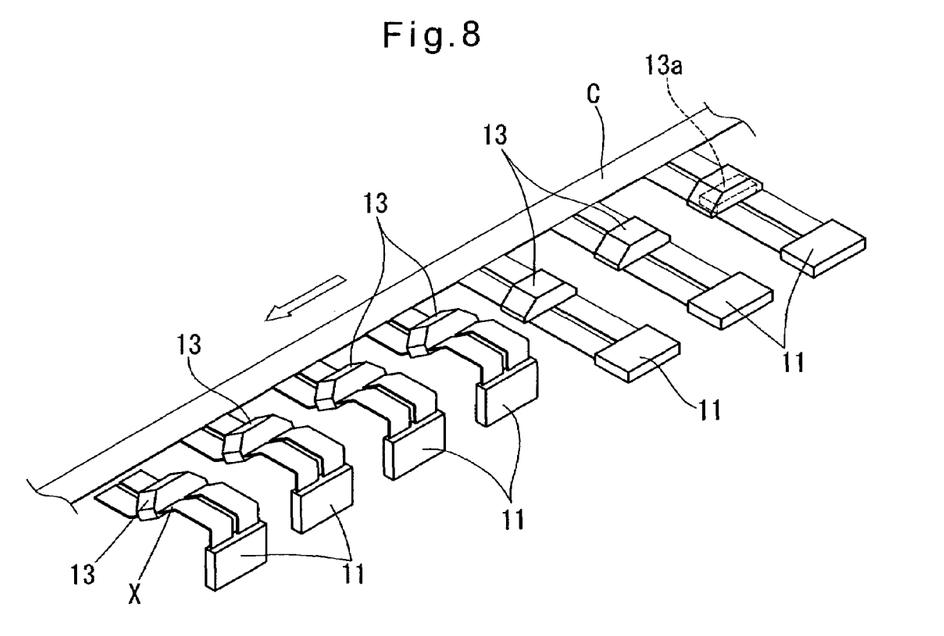
FIG. 8 shows how detectors for the rotation sensor according to the present invention are manufactured.

As shown in FIG. 8, a plurality of such detectors may be formed by bending respective pairs of lead pieces 12 each carrying a sensor element 11 and a resin-coated electronic part 13 and connected to a carrier C, and separating them from the carrier C, while moving the carrier C in the direction of the arrow. Alternatively, the respective pairs of lead pieces 12 may be bent after separating them from the carrier C.

The detector X is received in an opening 10e formed in a resin holder (bobbin) 10. A pair of relay terminals 14 which are inserted in the holder 10 are connected to the respective lead pieces 12 by spot welding such as resistance welding. In this state, the sensor element 11 is received in a hole 10c formed in the holder 10. The holder 10 has a projection 10d adapted to be inserted into a gap between the lead pieces 12 when the detector X is received in the holder 10, thereby positioning the detector X in the holder. Before a cover 4 is formed by molding, a gap (not shown) is preferably present between the forward end wall of the casing 1 and the forward end of the holder 10. With this arrangement, even when axial pressure is applied to the holder when forming the cover 4 by molding, the holder 10 will not be pressed against the forward end wall of the casing 1. This protects the sensor element 11 against damage. Alternatively, as shown in FIG. 2, a gap s may be present between the forward end wall of the casing 1 and the front end face of the sensor element 11 with the holder 10 in abutment with the forward end wall of the casing 1. This arrangement also protects the sensor element 11 when forming the cover 4. But either arrangement is not an essential requirement in this invention.

Now referring to FIG. 9, the distance L1 between the rotary member B to be detected and the forward end wall of the casing 1 is preferably sufficiently large in order to prevent them from colliding against each other. On the other hand, the distance between the rotary member B and the sensor element 7 (or sensor element 11 according to the present invention) has to be sufficiently short for higher accuracy of detection. To meet both of these requirements, the sensor element 7 or 11 should be arranged as close as possible to or in contact with the forward end wall of the casing 1. For example, if the sensor element 7 or 11 is in contact with the forward end wall of the casing 1, and the forward end wall of the casing 1 has a thickness of 0.2 mm, then even if the distance L1 is sufficiently large, e.g. 2.3 mm, the sensor element 7 or 11 is arranged sufficiently close to the rotary member B (i.e. spaced therefrom only by a distance of 2.5 mm). On the other hand, if the gap s (see FIG. 2) is 0.3 mm, and the distance between the sensor element 7 or 11 and the rotary member B is 2.5 mm, the distance L1 will be narrowed to 2.0 mm. Thus, the gap s has to be determined taking these factors into consideration too.

Figure 5:
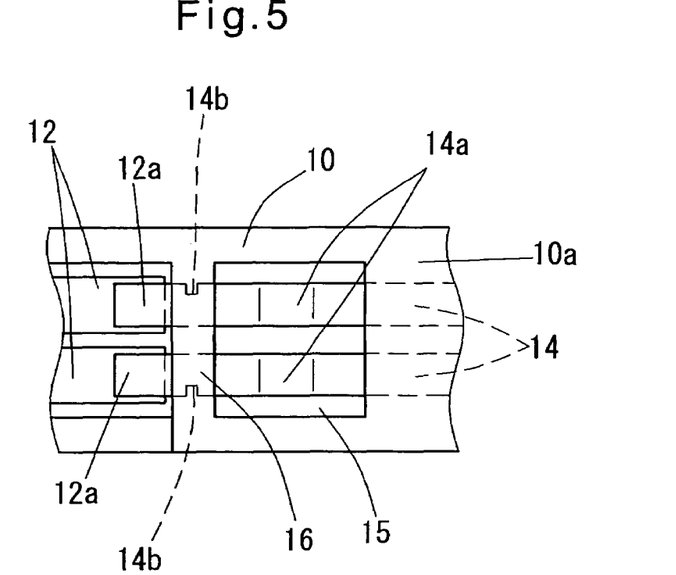
FIG. 5 is a partial plan view of the rotation sensor of FIG. 1, showing connecting portions of a pair of lead pieces that are connected to respective relay terminals.

The relay terminals 14 extend through a base portion 10a of the holder 10, a gap 16 and a support wall 16 integral with the holder 10. As shown in FIG. 5, the relay terminals 14 are formed with cutouts 14b at their portions disposed in the support wall 16. With this arrangement, when forming the support wall 16 by molding a resin, part of the resin will fill the cutouts 14b and hardens, thereby rigidly fixing the relay terminals 14 to the support wall 16.

A lid 17 made of a synthetic resin is fitted in the opening 10e of the holder 10 to press the detector X against the holder 10, thereby holding the detector X in position in the holder 10. The lid 17 has a downwardly extending projection 18 adapted to be inserted between the relay terminals 14, thereby separating, i.e. insulating the relay terminals 14 as well as the lead pieces 12 from each other. If the detector X is not properly and stably set in position, the lid 17 cannot be snugly fit in the holder 10 because its projection 18 cannot be inserted between the relay terminals 14. Thus, this fact is instantly detected by an operator.

With the detector X mounted on the holder 10 in the manner described above, the holder 10 is inserted into the cylindrical metallic casing 1 until its base portion 10a fits in the opening 1a of the casing 1. Then, an output cable 6 is connected to the ends of the relay terminals 14 protruding from the base portion 10a of the holder 10, a mounting fixture 20 is fitted on the casing 1, and the cover 4 is formed by molding a resin so as to enclose the opening 1a of the casing 1, the exposed portion of the holder 10, and the exposed portions of the relay terminals 14 and the output cable 6. The rotation sensor P is thus formed.

The cover 4 is formed by molding a resin with the casing 1 fixed in position. When forming the cover 4 by molding a resin, pressure is applied through a flange 1b of the casing 1 to the holder 10 as shown by two-dot chain lines in FIG. 2. The holder thus tends to bulge in the axial direction in the casing 1. The relay terminals 14 are thus pushed in the axial direction too. But since this pushing force is absorbed by the portions of the relay terminals 14 in the gap 15, and the relay terminals 14 are rigidly fixed to the support wall 16, no pushing force will act on the portions of the relay terminals 14 forwardly of the wall 16 and on the detector X.

Figure 6A:
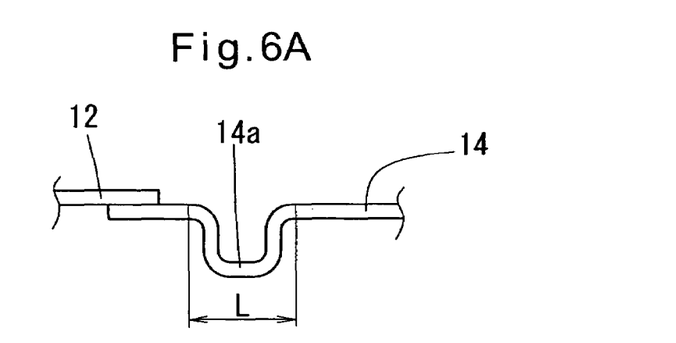
FIGS. 6A and 6B show the bent portion of one of the pair of relay terminals, showing two different states.
Figure 6B:
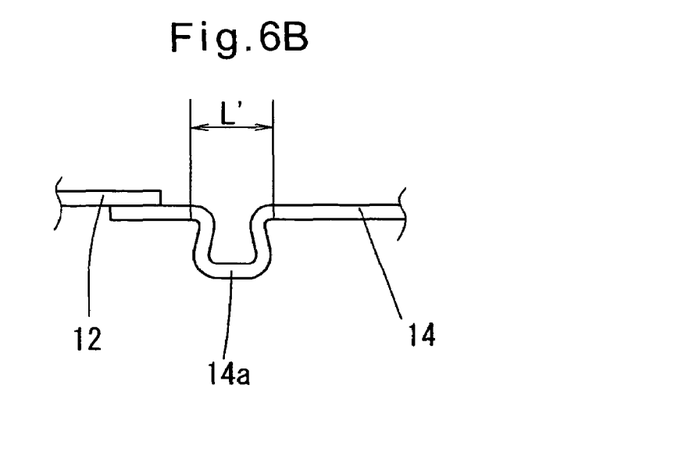

The portions of the relay terminals 14 that are present in the gap 15 are preferably bent as shown at 14a in FIG. 2 to more effectively absorb any pushing force applied to the relay terminals 14 when forming the cover 4. Specifically, any pushing force to the relay terminals 14 when forming the cover 4 is absorbed by deformation of the bent portion 14a such that its length decreases from L (FIG. 6A) to L' (FIG. 6B). But the bent portions 14b may not be formed. Even if the relay terminals 14 are straight, when pushing force is applied to the relay terminals 14, their portions in the gap 14 will deflect, thereby absorbing the pushing force, because the relay terminals 14 are rigidly fixed to the support plate 16. If the bent portions 14a are provided, their degree of bending should be determined taking into consideration the degree to which the pushing force is absorbed by the bent portions 14a.

Figure 7:
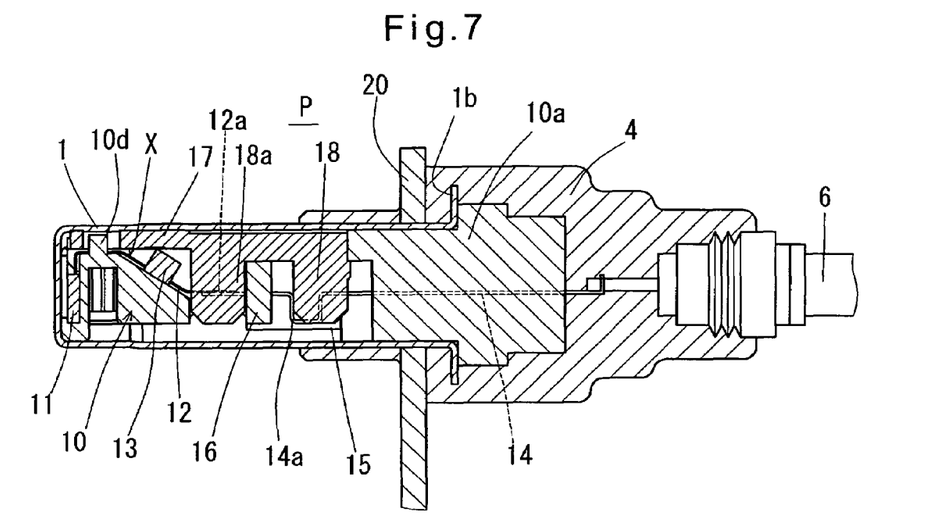
FIG. 7 is a front view in vertical section of another embodiment.

As shown in FIG. 7, the lid 17 may be provided with an additional projection 18a adapted to be inserted between connecting portions 12a (see FIG. 2) of the lead pieces 12 connected to the respective relay terminals 14 to separate and insulate the connecting portions 12a from each other. If the projection 18a cannot be fit between the connecting portions 12a, one can instantly see that there exist such defects as impermissible misalignment of the lead pieces 12 and the relay terminals 14, or burrs on the connecting portions 12a due to resistance welding.

The relay terminals 14 may be connected to the respective lead pieces 12 not by spot welding but by soldering or any other known means. In this case, too, the connecting portions 12a should be separated or insulated from each other by inserting the projection 18a. If the projection 18a is provided, the projection 18 may be omitted. In addition to or instead of such a projection 18a, a second projection 18a may be provided so as to be inserted between portions of the lead pieces 12 other than the connecting portions 12b.

The rotation sensor shown is a wheel speed sensor. But the rotation sensor according to the present invention may be a sensor for sensing the rotational speed of a different rotary member, or may be a different type of sensor such as an electromagnetic pickup type. While not shown, in another arrangement of the present invention, in the conventional sensor shown in FIG. 9, the lead wires 9 are replaced with lead pieces and the support wall 16 is provided.

What is claimed is:

1. A rotation sensor comprising a casing having an opening at one end thereof, a holder having a base portion and inserted in said casing with said base portion fitted in said opening of said casing, a detector mounted on said holder and received in said casing for sensing any change in a magnetic field produced when a rotary member rotates and converting such change in the magnetic field to electrical signals, a pair of relay terminals having protruding ends protruding from an outer end face of said base portion of said holder, an output line connected to said protruding ends of said relay terminals, a cover formed of a resin and covering said opening of said casing, a portion of said holder protruding outwardly from said opening of said casing, said protruding ends of said relay terminals, and a portion of said output line connected to said protruding ends of said relay terminals, said holder being formed of a resin and defining a gap, and a support wall fixed to said holder, said detector comprising a sensor element for sensing any change in the magnetic field produced from the rotary member, and a pair of lead pieces extending from said sensor element in parallel to each other, said relay terminals extending through said base portion of said holder and said gap, being fixed to said support wall, and each being directly connected to one of said lead pieces, and said gap being so formed as to provide a clearance around said relay terminals.

2. The rotation sensor of claim 1 wherein said holder has an opening in which said detector is mounted, said rotation sensor further comprising a lid having a projection and inserted in said opening of said holder with said projection inserted between said pair of relay terminals.

3. The rotation sensor of claim 1 wherein said holder has an opening in which said detector is mounted, said rotation sensor further comprising a lid having a projection and inserted in said opening of said holder with said projection inserted between connecting portions of said relay terminals connected to said detector.

4. The rotation sensor of claim 1 wherein said casing has an end wall opposite to said opening of said casing, and wherein a gap is defined between an inner surface of said end wall and an end face of said holder opposing said inner surface of said end wall.

5. A rotation sensor comprising a casing having an opening at one end thereof, a holder having a base portion and inserted in said casing with said base portion fitted in said opening of said casing, a detector mounted on said holder and received in said casing for sensing any change in a magnetic field produced when a rotary member rotates and converting such change in the magnetic field to electrical signals, a pair of relay terminals having protruding ends protruding from an outer end face of said base portion of said holder, an output line connected to said protruding ends of said relay terminals, and a cover formed of a resin and covering said opening of said casing, a portion of said holder protruding outwardly from said opening of said casing, said protruding ends of said relay terminals, and a portion of said output line connected to said protruding ends of said relay terminals, said holder being formed of a resin and defining a gap, said detector comprising a sensor element for sensing any change in the magnetic field produced from the rotary member, and a pair of lead pieces extending from said sensor element in parallel to each other, said relay terminals extending through said base portion of said holder and said gap, and each being directly connected to one of said pair of lead pieces, each of said relay terminals having a convex bent portion for absorbing any pushing force applied through said base portion of said holder in said gap, and said gap being so formed as to provide a clearance around said convex bent portion of said relay terminals, the rotation sensor further comprising a support wall connected to said holder, said relay terminals extending through said base portion of said holder, said gap and said support wall and each being connected to one of said pair of lead pieces.

* * * * *